United States Patent
Boies et al.

(10) Patent No.: US 10,304,448 B2
(45) Date of Patent: *May 28, 2019

(54) ENVIRONMENTALLY AWARE DIALOG POLICIES AND RESPONSE GENERATION

(71) Applicant: Microsoft Technology Licensing, LLC, Redmond, WA (US)

(72) Inventors: Daniel Boies, St. Lambert (CA); Larry Heck, Los Altos, CA (US); Tasos Anastasakos, San Jose, CA (US); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,227

(22) Filed: Feb. 21, 2017

(65) Prior Publication Data
US 2017/0162201 A1    Jun. 8, 2017

Related U.S. Application Data

(63) Continuation of application No. 13/923,917, filed on Jun. 21, 2013, now Pat. No. 9,589,565.

(51) Int. Cl.
*G10L 15/00*    (2013.01)
*G10L 15/22*    (2006.01)
(Continued)

(52) U.S. Cl.
CPC .......... *G10L 15/22* (2013.01); *G06F 17/2785* (2013.01); *G10L 17/22* (2013.01)

(58) Field of Classification Search
CPC .... H04M 3/436; H04M 3/42348; G10L 15/22
(Continued)

(56) References Cited

U.S. PATENT DOCUMENTS 5,170,499 A * 12/1992 Grothause .............. H04B 7/005
                                                        381/57
5,233,681 A    8/1993 Bahl
(Continued)

FOREIGN PATENT DOCUMENTS

CN    1622646    6/2005
CN    1830025    9/2006
(Continued)

OTHER PUBLICATIONS

European Office Action in Application 15719880.5, dated Aug. 22, 2017, 5 pages.
(Continued)

*Primary Examiner* — Daniel Abebe

(57) ABSTRACT

Environmental conditions, along with other information, are used to adjust a response of a conversational dialog system. The environmental conditions may be used at different times within the conversational dialog system. For example, the environmental conditions can be used to adjust the dialog manager's output (e.g., the machine action). The dialog state information that is used by the dialog manager includes environmental conditions for the current turn in the dialog as well as environmental conditions for one or more past turns in the dialog. The environmental conditions can also be used after receiving the machine action to adjust the response that is provided to the user. For example, the environmental conditions may affect the machine action that is determined as well as how the action is provided to the user. The dialog manager and the response generation components in the conversational dialog system each use the available environmental conditions.

20 Claims, 9 Drawing Sheets

(51) Int. Cl.
*G10L 17/22* (2013.01)
*G06F 17/27* (2006.01)

(58) Field of Classification Search
USPC .......................................................... 704/275
See application file for complete search history.

(56) References Cited

U.S. PATENT DOCUMENTS

| | | | |
|---|---|---|---|
| 6,167,377 A | 12/2000 | Gillick et al. | |
| 6,185,528 B1 | 2/2001 | Fissore et al. | |
| 6,263,308 B1 | 7/2001 | Heckerman | |
| 6,405,132 B1* | 6/2002 | Breed | B60N 2/002 |
| | | | 701/117 |
| 6,970,947 B2 | 11/2005 | Ebling et al. | |
| 7,505,772 B2* | 3/2009 | Himmelstein | G06Q 10/10 |
| | | | 455/456.1 |
| 7,729,902 B1 | 6/2010 | Gupta | |
| 7,788,602 B2 | 8/2010 | Reynar et al. | |
| 7,835,910 B1 | 11/2010 | Hakkani-Tur et al. | |
| 8,015,006 B2 | 9/2011 | Kennewick et al. | |
| 8,229,729 B2 | 7/2012 | Sarikaya et al. | |
| 8,275,615 B2 | 9/2012 | Kozat | |
| 8,296,107 B2 | 10/2012 | Turner et al. | |
| 8,315,597 B2* | 11/2012 | Olincy | H04M 3/42348 |
| | | | 455/410 |
| 8,321,220 B1 | 11/2012 | Chotimongkol et al. | |
| 8,326,634 B2 | 12/2012 | Di Cristo et al. | |
| 8,346,563 B1 | 1/2013 | Hjelm et al. | |
| 8,352,245 B1 | 1/2013 | Lloyd | |
| 8,400,332 B2 | 3/2013 | Szwabowski et al. | |
| 8,412,521 B2 | 4/2013 | Mathias et al. | |
| 8,447,608 B1 | 5/2013 | Chang et al. | |
| 8,527,276 B1 | 9/2013 | Senior et al. | |
| 8,571,866 B2 | 10/2013 | Melamed et al. | |
| 8,620,659 B2 | 12/2013 | Di Cristo et al. | |
| 8,838,457 B2 | 9/2014 | Cerra et al. | |
| 9,311,298 B2 | 4/2016 | Sarikaya et al. | |
| 9,324,321 B2 | 4/2016 | Xue et al. | |
| 9,324,323 B1 | 8/2016 | Bikel et al. | |
| 9,424,840 B1 | 8/2016 | Hart et al. | |
| 9,697,200 B2 | 7/2017 | Sarikaya et al. | |
| 2002/0083041 A1 | 6/2002 | Achiloptas | |
| 2002/0116171 A1 | 8/2002 | Russell | |
| 2003/0125948 A1 | 7/2003 | Lyudovyk | |
| 2003/0212543 A1 | 11/2003 | Epstein | |
| 2003/0212544 A1 | 11/2003 | Acero | |
| 2004/0088726 A1 | 5/2004 | Ma et al. | |
| 2004/0176083 A1* | 9/2004 | Shiao | H04M 3/436 |
| | | | 455/417 |
| 2005/0065789 A1 | 3/2005 | Yacoub | |
| 2005/0091057 A1 | 4/2005 | Mark et al. | |
| 2005/0144013 A1 | 6/2005 | Fujimoto et al. | |
| 2005/0165598 A1 | 7/2005 | Cote et al. | |
| 2006/0036444 A1 | 2/2006 | Hwang | |
| 2006/0287856 A1 | 12/2006 | He et al. | |
| 2007/0038436 A1 | 2/2007 | Cristo et al. | |
| 2007/0128979 A1 | 6/2007 | Shackelford | |
| 2007/0150428 A1 | 6/2007 | Webb | |
| 2007/0156392 A1 | 7/2007 | Balchandran et al. | |
| 2007/0203863 A1 | 8/2007 | Gupta | |
| 2007/0226649 A1 | 9/2007 | Agmon | |
| 2007/0271086 A1 | 11/2007 | Peters et al. | |
| 2007/0275697 A1* | 11/2007 | Aminzadeh | H04M 3/436 |
| | | | 455/414.1 |
| 2007/0288404 A1 | 12/2007 | Kacmarcik | |
| 2008/0004877 A1 | 1/2008 | Tian | |
| 2008/0195388 A1 | 8/2008 | Bower et al. | |
| 2008/0215183 A1 | 9/2008 | Chen | |
| 2008/0235017 A1* | 9/2008 | Satomura | G10L 15/22 |
| | | | 704/246 |
| 2009/0030697 A1 | 1/2009 | Cerra et al. | |
| 2009/0292687 A1 | 11/2009 | Fan | |
| 2010/0004930 A1 | 1/2010 | Strope | |
| 2010/0106500 A1 | 4/2010 | McKee | |
| 2010/0114890 A1 | 5/2010 | Hagar | |
| 2010/0128863 A1 | 5/2010 | Krum et al. | |
| 2010/0211695 A1 | 8/2010 | Steinmetz et al. | |
| 2010/0267345 A1 | 10/2010 | Berton | |
| 2010/0312546 A1 | 12/2010 | Chang et al. | |
| 2011/0010171 A1 | 1/2011 | Talwar et al. | |
| 2011/0093459 A1 | 4/2011 | Dong et al. | |
| 2011/0144999 A1 | 6/2011 | Jang et al. | |
| 2011/0153324 A1 | 6/2011 | Ballinger et al. | |
| 2011/0296374 A1 | 12/2011 | Wu et al. | |
| 2012/0058756 A1* | 3/2012 | Olincy | H04M 1/64 |
| | | | 455/417 |
| 2012/0065976 A1 | 3/2012 | Deng | |
| 2012/0084086 A1 | 4/2012 | Gilbert | |
| 2012/0232885 A1 | 9/2012 | Barbosa et al. | |
| 2012/0245944 A1 | 9/2012 | Gruber | |
| 2012/0253799 A1 | 10/2012 | Bangalore | |
| 2012/0253802 A1 | 10/2012 | Heck et al. | |
| 2012/0254086 A1 | 10/2012 | Deng | |
| 2012/0254227 A1 | 10/2012 | Heck | |
| 2012/0265531 A1 | 10/2012 | Bennett | |
| 2012/0271617 A1 | 10/2012 | Nakajima et al. | |
| 2012/0290293 A1 | 11/2012 | Hakkani-Tur et al. | |
| 2012/0303565 A1 | 11/2012 | Deng et al. | |
| 2013/0031476 A1 | 1/2013 | Coin et al. | |
| 2013/0085756 A1 | 4/2013 | Chotimongkol et al. | |
| 2013/0127614 A1* | 5/2013 | Velusamy | H04M 1/663 |
| | | | 340/539.11 |
| 2013/0138436 A1 | 5/2013 | Yu | |
| 2013/0152092 A1 | 6/2013 | Yadger | |
| 2013/0163860 A1 | 6/2013 | Suzuki et al. | |
| 2013/0185065 A1 | 7/2013 | Tzirkel-Hancock et al. | |
| 2013/0317822 A1 | 11/2013 | Koshinaka | |
| 2013/0325148 A1 | 12/2013 | Mustafa et al. | |
| 2014/0025380 A1 | 1/2014 | Koch et al. | |
| 2014/0163959 A1 | 6/2014 | Hebert et al. | |
| 2014/0214410 A1 | 7/2014 | Jang | |
| 2014/0228007 A1* | 8/2014 | Velusamy | H04M 1/663 |
| | | | 455/414.1 |
| 2014/0257803 A1 | 9/2014 | Yu et al. | |
| 2014/0358537 A1 | 12/2014 | Gilbert | |
| 2014/0372112 A1 | 12/2014 | Xue et al. | |
| 2014/0379326 A1 | 12/2014 | Sarikaya et al. | |
| 2014/0379353 A1 | 12/2014 | Boies et al. | |
| 2015/0100312 A1 | 4/2015 | Bocchieri | |
| 2015/0161993 A1 | 6/2015 | Sainath | |
| 2015/0161994 A1 | 6/2015 | Tang | |
| 2015/0170020 A1 | 6/2015 | Garimella | |
| 2015/0255061 A1 | 9/2015 | Xue et al. | |
| 2015/0255069 A1 | 9/2015 | Adams | |
| 2015/0278191 A1 | 10/2015 | Levit et al. | |
| 2015/0310858 A1 | 10/2015 | Li et al. | |
| 2015/0325236 A1 | 11/2015 | Levit et al. | |
| 2016/0203125 A1 | 7/2016 | Sarikaya et al. | |
| 2016/0325236 A1 | 11/2016 | Lee et al. | |
| 2017/0103753 A1 | 4/2017 | Levit et al. | |
| 2017/0162201 A1 | 6/2017 | Boies et al. | |
| 2017/0255612 A1 | 9/2017 | Sarikaya et al. | |
| 2017/0337918 A1 | 11/2017 | Xue et al. | |

FOREIGN PATENT DOCUMENTS

| | | |
|---|---|---|
| CN | 101415039 | 4/2009 |
| CN | 102609264 | 7/2012 |
| CN | 102737099 | 10/2012 |
| CN | 102792320 | 11/2012 |
| CN | 103049792 A | 4/2013 |
| CN | 103400577 A | 11/2013 |
| CN | 103456299 A | 12/2013 |
| EP | 0553101 | 7/1997 |
| EP | 2575128 | 4/2013 |
| EP | 2619713 A1 | 7/2013 |
| JP | H01312196 A | 12/1989 |
| JP | 2002/091477 | 3/2002 |
| JP | 2003280683 A | 10/2003 |
| JP | 2004227468 A | 8/2004 |
| JP | 2007264128 A | 10/2007 |
| JP | 2009230068 A | 10/2009 |
| JP | 2012075047 A | 4/2012 |

(56) References Cited

FOREIGN PATENT DOCUMENTS

| | | |
|---|---|---|
| JP | 2012118668 A | 6/2012 |
| JP | 2012128440 A | 7/2012 |
| KR | 20130022513 | 3/2013 |
| KR | 20140108609 | 9/2014 |
| RU | 2187902 C2 | 8/2002 |
| RU | 2004123352 A | 1/2006 |
| RU | 2011122784 | 12/2012 |
| WO | WO 2005/013262 | 2/2005 |
| WO | 2008081543 A1 | 7/2008 |
| WO | 2010051654 A1 | 5/2010 |
| WO | 2013149123 A1 | 10/2013 |
| WO | WO 2013/171481 | 11/2013 |

OTHER PUBLICATIONS

U.S. Appl. No. 15/389,088, Notice of Allowance dated Sep. 7, 2017, 13 pages.
U.S. Appl. No. 15/076,125, Notice of Allowance dated May 15, 2017, 2 pages.
U.S. Appl. No. 15/076,125, 312 Amendment filed May 19, 2017, 3 pages.
U.S. Appl. No. 15/076,125, Response to 312 Amendment dated May 31, 2017, 2 pages.
Chinese Office Action in Application 201480035401.9, dated May 15, 2017, 17 pages.
Mexican Office Action in Application MX/a/2015/017624, dated Apr. 6, 2017, 2 pages. (No English Translation).
U.S. Appl. No. 13/920,323, Amendment and Response filed Mar. 20, 2017, 12 pgs.
U.S. Appl. No. 13/920,323, Notice of Allowance dated Apr. 3, 2017, 9 pgs.
"Integrated Development Environments for Natural Language Processing", Published on: Oct. 2001, Available at: http://www.textanalysis.com/TAI-IDE-WP.pdf; 13 pgs.
Abad, et al., "Context Dependent Modelling Approaches for Hybrid Speech Recognizers", In Proceeding of INTERSPEECH, Sep. 26, 2010, 4 pages.
Abdel-Hamid, et al., "Fast Speaker Adaptation of Hybrid NN/HMM Model for Speech Recognition Based on Discriminative Learning of Speaker Code", In IEEE International Conference on Acoustics, Speech and Signal Processing, May 26, 2013, 5 pages.
Abid, et al., "A New Neural Network Pruning Method Based on the Singular Value Decomposition and the Weight Initialisation", In Proceedings of 11th European Signal Processing Conference, Sep. 3, 2002, 4 pages.
Barman, et al., "Nonnegative Matrix Factorization (NMF) Based Supervised Feature Selection and Adaptation", In Proceedings of the 9th International Conference on Intelligent Data Engineering and Automated Learning, Nov. 2, 2008, 2 pages.
Bohus, et al., "Olympus: An Open-Source Framework for Conversational Spoken Language Interface Research", In Proceedings of the Workshop on Bridging the Gap: Academic and Industrial Research in Dialog Technologies, Apr. 2007, 8 pages.
Chandrasekaran et al., "Sparse and Low-Rank Matrix Decompositions"; IFAC Symposium on System Identification, 2009; 6 pgs.
Chen, Wei, "Building Language Model on Continuous Space using Gaussian Mixture Models", In Proceedings of Research in Language Modeling, Jan. 2007, 66 pages.
Dahl, et al., "Context-Dependent Pre-Trained Deep Neural Networks for Large Vocabulary Speech Recognition", In IEEE Transactions on Audio, Speech, and Language Processing, vol. 20, Issue 1, Jan. 1, 2012, 13 pages.
Dahl, et al., "Large Vocabulary Continuous Speech Recognition with Context-Dependent DBN-HMMs", In IEEE International Conference on Acoustics, Speech and Signal Processing, May 22, 2011, 4 pages.
Davis, et al., "Low-Rank Approximations for Conditional Feedforward Computation in Deep Neural Networks", In Proceedings of ArXiv preprint arXiv:1312.4461, Dec. 2013, 9 pages.

Deng et al., "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.
Dos Reis Mota, Pedro Jose, "LUP: A Language Understanding Platform", A Dissertation for the Degree of Master of Information Systems and Computer Engineering, Jul. 2012, 128 pages.
Eagle, et al., "Common Sense Conversations: Understanding Casual Conversation using a Common Sense Database", In Proceedings of the Artificial Intelligence, Information Access, and Mobile Computing Workshop; Aug. 2003, 6 pages.
European Official Communication in Application 14736140.6, dated Jan. 28, 2016, 2 pgs.
European Official Communication in Application 14736143.0, dated Feb. 2, 2016, 2 pgs.
Gemello, et al., "Adaptation of Hybrid ANN/HMM Models Using Linear Hidden Transformations and Conservative Training", In IEEE International Conference on Acoustics, Speech and Signal Processing, May 14, 2006, 4 pages.
Gruenstein, et al., "Context-Sensitive Language Modeling for Large Sets of Proper Nouns in Multimodal Dialogue Systems", In Proceedings of IEEE/ACL Workshop on Spoken Language Technology, Dec. 10, 2006, 4 pages.
He et al; "What is Discriminative Learning"; Achorn International; Jun. 25, 2008; 25 pgs.
Heck et al.; "Robustness to Telephone Handset Distortion in Speaker Recognition by Discriminative Feature Design"; In Journal of Speech Communication—Speaker Recognition and its Commercial and Forensic Applications, vol. 31, Issue 2-3; Jun. 2000; http://rmcet.com/lib/E-Journals/Speech%20Communication/1-s2.0-50167639399000771-main.pdf; 12 pgs.
Hinton, et al., "Deep Neural Networks for Acoustic Modeling in Speech Recognition", In IEEE Signal Processing Magazine, vol. 29, Issue 6, Nov. 2012, 27 pages.
Hoffmeister et al., "Log-Linear Model Combination with Word-Dependent Scaling Factors"; Human Language Technology and Pattern Recognition Computer Science Department; Sep. 6-10; Brighton UK; Copyright © 2009 ISCA; 4 pgs.
Huang et al., "Unified Stochastic Engine (USE) for Speech Recognition"; School of Computer Science; 1993 IEEE; 4 pgs.
Jaitly, et al., "An Application of Pretrained Deep Neural Networks to Large Vocabulary Conversational Speech Recognition", In Proceedings of 13th Annual Conference of the International Speech Communication Association, Mar. 12, 2012, 11 pages.
Keshtkar et al., "A Corpus-based Method for Extracting Paraphrases of Emotion Terms"; Proceedings of the NAACL HLT 2010 Workshop on Computational Approaches to Analysis and Generation of Emotion in Text; Jun. 2010; 10 pgs.
Ko, et al., "Cammia—A Context-Aware Spoken Dialog System for Mobile Environments", In Automatic Speech Recognition and Understanding Workshop, Jul. 29, 2011, 2 pages.
Konig et al., "Nonlinear Discriminant Feature Extraction for Robust Text-Independent Speaker Recognition"; In Proceeding of the RLA2C, ESCA workshop on Speaker Recognition and its Commercial and Forensic Applications; Apr. 1998; http://www.msr-waypoint.com/pubs/193653/konig_heck_DNN.pdf; 4 pgs.
Lecouteux et al., "Dynamic Combination of Automatic Speech Recognition Systems by Driven Decoding"; In Journal of IEEE Transactions on Audio, Speech and Language Processing; Jan. 2013; http://hal.archives-ouvertes.fr/docs/00/75/86/26/PDF/SystemCombination.pdf; 10 pgs.
Lee, et al., "Intention-Based Corrective Feedback Generation using Context-Aware Model", In Proceedings of the Second International Conference on Computer Supported Education, Apr. 7, 2010, 8 pages.
Li et al., "Lattice Combination for Improved Speech Recognition"; In Proceedings of the 7th International Conference of Spoken Language Processing; Sep. 16, 2002; http://www.cs.cmu.edu/afs/cs/user/robust/www/Papers/icslp02_xiang.pdf; 4 pgs.
Li, et al., "Comparison of Discriminative Input and Output Transformations for Speaker Adaptation in the Hybrid NN/HMM Systems", In Proceedings of 11th Annual Conference of the International Speech Communication Association, Sep. 26, 2010, 4 pages.

(56) References Cited

OTHER PUBLICATIONS

Liao, Hank, "Speaker Adaptation of Context Dependent Deep Neural Networks", In IEEE International Conference on Acoustics, Speech and Signal Processing, May 26, 2013, 5 pages.
Lilly, et al., "Robust Speech Recognition Using Singular Value Decomposition Based Speech Enhancement," IEEE TENCON, 1997, 4 pgs.
Liu, et al., "Language Model Combination and Adaptation using Weighted Finite State Transducers", In Proceedings of IEEE International Conference on Acoustics Speech and Signal Processing, Mar. 14, 2010, 4 pages.
Liu, et al., "Use of Contexts in Language Model Interpolation and Adaptation", In Journal of Computer Speech and Language vol. 27 Issue 1, Feb. 2009, 23 pages.
Meinedo et al., "Combination of Acoustic Models in Continuous Speech Recognition Hybrid Systems"; In Proceedings of Sixth International Conference on Spoken Language Processing; Oct. 2000; http://www.inesc-id.pt/pt/indicadores/Ficheiros/416.pdf; 4 pgs.
Mohamed, et al., "Acoustic Modeling Using Deep Belief Networks", In IEEE Transactions on Audio, Speech, and Language Processing, vol. 20, Issue 1, Jan. 2012, 10 pages.
Moreira, et al., "Towards the Rapid Development of a Natural Language Understanding Module", In Proceedings of the 10th International Conference on Intelligent Virtual Agents, Jan. 2011, 7 pages.
Motlicek et al., "Feature and Score Level Combination of Subspace Gaussinasin LVCSR Task"; In IEEE International Conference on Acoustics, Speech and Signal Processing; May 26, 2013; http://ieeexplore.ieee.org/stamp/stamp.jsp?tp=&arnumber=6639142; 5 pgs.
Notice of Allowance dated Dec. 15, 2015 in U.S. Appl. No. 13/923,917, 7 pgs.
Notice of Allowance dated Dec. 18, 2015 in U.S. Appl. No. 14/201,704, 15 pgs.
Notice of Allowance dated Mar. 4, 2016 in U.S. Appl. No. 13/923,917, 5 pgs.
Notice of Allowance dated Nov. 30, 2015 in U.S. Appl. No. 13/923,969, 12 pgs.
Notice of Allowance dated Oct. 1, 2015 in U.S. Appl. No. 13/923,969, 7 pgs.
Novak, et al., "Use of Non-Negative Matrix Factorization for Language Model Adaptation in a Lecture Transcription Task", In Proceedings of IEEE International Conference on Acoustics, Speech, and Signal Processing, vol. 1, May 7, 2001, 4 pages.
PCT 2nd Written Opinion in International Application PCT/US2015/029334, dated Mar. 31, 2016, 5 pgs.
PCT International Search Report and Written Opinion Issued in PCT Application No. PCT/US2014/041014, dated Oct. 2, 2014, 9 Pages.
PCT International Search Report and Written Opinion Issued in PCT Application No. PCT/US2014/041023, dated Jun. 3, 2015, 17 Pages.
PCT International Search Report and Written Opinion Issued in PCT Application No. PCT/US2015/017872, dated Jun. 25, 2015, 11 Pages.
PCT International Search Report and Written Opinion Issued in PCT Application No. PCT/US2015/021921, dated Jul. 17, 2015, 11 Pages.
PCT International Search Report and Written Opinion Issued in PCT Application No. PCT/US2015/029334, dated Jul. 7, 2015, 12 Pages.
PCT Preliminary Report on Patentability dated Dec. 14, 2015 in Appln No. PCT/US2015/017872, 7 pgs.
PCT Preliminary Report on Patentability dated Nov. 13, 2015 in Appln No. PCT/US2014/041023, 7 pgs.
PCT Preliminary Report on Patentability dated Sep. 15, 2015 in Appln No. PCT/US2014/041014, 6 pgs.
PCT Written Opinion dated Feb. 11, 2016 in Appln No. PCT/US2015/021921, 7 pgs.
Response dated Aug. 6, 2015 in U.S. Appl. No. 13/923,969, 7 pgs.
Response dated Aug. 7, 2015 in U.S. Appl. No. 13/923,917, 10 pgs.
Response dated May 21, 2015 in U.S. Appl. No. 13/920,323, 15 pgs.
Sainath, et al., "Auto-Encoder Bottleneck Features Using Deep Belief Networks", In Proceedings of IEEE International Conference on Acoustics, Speech and Signal Processing, Mar. 25, 2012, 4 pages.
Sainath, et al., "Low-Rank Matrix Factorization for Deep Neural Network Training with High-Dimensional Output Targets", In proceedings of IEEE International Conference on Acoustics, Speech and Signal Processing, May 26, 2013, 5 pages.
Sainath, et al., "Making Deep Belief Networks Effective for Large Vocabulary Continuous Speech Recognition", In Proceedings of IEEE Workshop on Automatic Speech Recognition and Understanding, Dec. 11, 2011, 6 pages.
Saluja, et al., "Context-aware Language Modeling for Conversational Speech Translation", In Proceedings of Machine Translation Summit XIII, Sep. 19, 2011, 8 pages.
Sarukkai et al., "Word Set Probability Boosting for Improved Spontaneous Dialog Recognition"; IEEE Transactions on Speech and Audio Processing, vol. 5, No. 5, Sep. 1997; 13 pgs.
Sarukkai, et al., "Improved Spontaneous Dialogue Recognition Using Dialogue and Utterance Triggers by Adaptive Probability Boosting", In Fourth International Conference on Spoken Language, vol. 1, Oct. 3, 1996, 4 pages.
Seide, et al., "Conversational Speech Transcription using Context-Dependent Deep Neural Networks", In Proceeding of 12th Annual Conference of the International Speech Communication Association, Aug. 28, 2011, 4 pages.
Seneff, et al., "Galaxy-II: A Reference Architecture for Conversational System Development", In Proceedings of the 5th International Conference on Spoken Language Processing, Nov. 2008, 4 pages.
Sing, et al., "Domain Metric Knowledge Model for Embodied Conversation Agents", In 5th International Conference on Research, Innovation & Vision for the Future, Mar. 5, 2007, 7 pages.
Singh-Miller et al., "Dimensionality Reduction for Speech Recognition Using Neighborhood Components Analysis"; In Proceedings of 8th Annual Conference of the International Speech Communication Association, Antwerp; Dec. 27, 2007; http://www.cs.columbia.edu/~mcollins/papers/icslp07.pdf; 4 pgs.
Siniscalchi, et al., "Hermitian Based Hidden Activation Functions for Adaptation of Hybrid HMM/ANN Models", In Proceedings of 13th Annual Conference of the International Speech Communication Association, Sep. 9, 2012, 4 pages.
Su et al., "Error Back Propagation for Sequence Training of Context-Dependent Deep Networks for Conversational Speech Transcription"; In IEEE International Conference on Acoustics, Speech, and Signal Processing; May 26, 2013; http://research.microsoft.com/pubs/194345/0006664.pdf; 5 pgs.
Swietojanski et al., "Revisiting Hybrid and GMM-HMM System Combination Techniques"; In Proceeding of the IEEE International Conference on Acoustics, Speech and Signal Processing; May 26, 2013; http://homepages.inf.ed.ac.uk/s1136550/data/Swietojanski_ICASSP2013.pdf; 5 pgs.
Trmal, et al., "Adaptation of a Feedforward Artificial Neural Network Using a Linear Transform", In Proceedings of in Text, Speech and Dialogue, Sep. 10, 2010, 8 pgs.
U.S. Official Action dated Aug. 13, 2015 in U.S. Appl. No. 14/227,492, 37 pgs.
U.S. Official Action dated Feb. 27, 2015 in U.S. Appl. No. 13/920,323, 22 pgs.
U.S. Official Action dated Jan. 4, 2016 in U.S. Appl. No. 14/265,110, 49 pgs.
U.S. Official Action dated Jul. 1, 2015 in U.S. Appl. No. 14/201,704, 17 pgs.
U.S. Official Action dated May 28, 2015 in U.S. Appl. No. 13/923,917, 18 pgs.
U.S. Official Action dated May 6, 2015 in U.S. Appl. No. 13/923,969, 12 pgs.
U.S. Official Action dated Oct. 1, 2015 in U.S. Appl. No. 13/920,323, 34 pgs.
U.S. Official Action dated Sep. 24, 2015 in U.S. Appl. No. 13/920,323, 25 pgs.
U.S. Official Action dated Sep. 29, 2015 in U.S. Appl. No. 13/923,917, 9 pgs.

(56) References Cited

OTHER PUBLICATIONS

U.S. Appl. No. 13/920,323, Office Action dated Apr. 5, 2016, 23 pgs.
U.S. Appl. No. 13/923,917, Notice of Allowance dated Mar. 21, 2016, 2 pgs.
U.S. Appl. No. 13/923,969, Amendment after Allowance filed Feb. 29, 2016, 8 pgs.
U.S. Appl. No. 13/923,969, Notice of Allowance dated Feb. 18, 2016, 2 pgs.
U.S. Appl. No. 13/923,969, Notice of Allowance dated Mar. 9, 2016, 2 pgs.
U.S. Appl. No. 14/201,704, Amendment after Allowance filed Feb. 24, 2016, 6 pgs.
U.S. Appl. No. 14/201,704, USPTO Response dated Mar. 3, 2016, 2 pgs.
U.S. Appl. No. 14/227,492, Amendment and Response filed Jan. 13, 2016, 13 pgs.
U.S. Appl. No. 14/227,492, Notice of Allowance dated Apr. 19, 2016, 16 pgs.
U.S. Appl. No. 14/265,110, Amendment and Response filed Mar. 17, 2016, 17 pgs.
U.S. Appl. No. 14/273,100, Amendment and Response filed Jan. 4, 2016, 18 pgs.
U.S. Appl. No. 14/273,100, Amendment and Response filed Jun. 2, 2016, 12 pages.
U.S. Appl. No. 14/273,100, Office Action dated Mar. 3, 2016, 19 pgs.
U.S. Appl. No. 15/076,125, Office Action dated May 25, 2016, 13 pages.
Vanhoucke, et al., "Improving the Speed of Neural Networks on CPUs", In Proceedings of NIPS Workshop on Deep Learning and Unsupervised Feature Learning, Dec. 16, 2011, 8 pages.
Xiaodong, et al., "Discriminative Learning for Speech Recognition: Theory and Practice", In Book on Discriminative Learning for Speech Recognition: Theory and Practice, Chapter 1, Aug. 12, 2008, 25 Pages.
Xue, et al., "Restructuring of Deep Neural Network Acoustic Models with Singular Value Decomposition", In Proceedings of 14th Annual Conference of the International Speech Communication Association, Aug. 25, 2013, 5 pages.
Xue, et al., "Singular Value Decomposition Based Low-Footprint Speaker Adaptation and Personalization for Deep Neural Network", In Proceedings of the IEEE International Conference on Acoustics, Speech and Signal Processing, May 4, 2014, pp. 6359-6363.
Yan et al., "A Scalable Approach to Using DSS-Derived Features in GMM-HMM Based Acoustic Modeling for LVCSR"; In Proceeding of the 14th Annual Conference of the International Speech Communication Association; Aug. 25, 2013; http://homepages.inf.ed.ac.uk/s1136550/data/Swietojanski_ICASSP2013.pdf; 5 pgs.
Yao, et al., "Adaptation of Context-Dependent Deep Neural Networks for Automatic Speech Recognition", In IEEE Spoken Language Technology Workshop, Dec. 2, 2012, 4 pages.
Yu, et al., "Exploiting Sparseness in Deep Neural Networks for Large Vocabulary Speech Recognition", In Proceeding of IEEE International Conference on Acoustics, Speech and Signal Processing, Mar. 25, 2012, 4 pages.
Yu, et al., "Improved Bottleneck Features Using Pretrained Deep Neural Networks", In Proceedings of 12th Annual Conference of the International Speech Communication Association, Aug. 28, 2011, 4 pages.
Yu, et al., "KL-Divergence Regularized Deep Neural Network Adaptation for Improved Large Vocabulary Speech Recognition", In IEEE International Conference on Acoustics, Speech and Signal Processing, May 26, 2013, 5 pages.
Yu, et al., "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.
U.S. Appl. No. 13/920,323, Amendment and Response filed Aug. 5, 2016, 23 pages.
U.S. Appl. No. 13/923,917, Office Action dated Jun. 30, 2016, 10 pages.
U.S. Appl. No. 14/227,492, Notice of Allowance dated Aug. 4, 2016, 12 pages.
U.S. Appl. No. 14/265,110, Notice of Allowance dated Aug. 3, 2016, 21 pages.
U.S. Appl. No. 15/076,125, Amendment and Response filed Oct. 14, 2016, 11 pgs.
U.S. Appl. No. 13/923,917, Amendment and Response filed Sep. 30, 2016, 8 pgs.
U.S. Appl. No. 13/923,917, Notice of Allowance dated Oct. 20, 2016, 7 pgs.
U.S. Appl. No. 14/227,492, Notice of Allowance dated Oct. 14, 2016, 8 pgs.
U.S. Appl. No. 13/920,323, Office Action dated Nov. 18, 2016, 25 pgs.
U.S. Appl. No. 15/076,125, Office Action dated Dec. 8, 2016, 6 pgs.
U.S. Appl. No. 14/227,492, Amendment and Response filed Nov. 4, 2016, 6 pgs.
U.S. Appl. No. 15/076,125, Response filed Feb. 3, 2017, 3 pgs.
U.S. Appl. No. 15/076,125, Notice of Allowance dated Feb. 21, 2017, 5 pgs.
U.S. Appl. No. 13/923,917, Notice of Allowance dated Jan. 18, 2017, 2 pgs.
U.S. Appl. No. 13/923,917, Amendment filed Jan. 20, 2017, 6 pgs.
U.S. Appl. No. 13/923,917, USPTO Response dated Feb. 1, 2017, 2 pgs.
U.S. Appl. No. 15/389,088, Office Action dated Feb. 16, 2017, 17 pgs.
U.S. Appl. No. 14/273,100, Office Action dated Jan. 30, 2017, 15 pgs.
U.S. Appl. No. 13/920,323, Amendment and Response filed Dec. 9, 2015, 14 pages.
U.S. Appl. No. 14/273,100, Amendment and Response filed Jun. 30, 2017, 14 pages.
U.S. Appl. No. 15/389,088, Amendment and Response filed Jul. 17, 2017, 10 pages.
U.S. Appl. No. 15/389,088, Office Action dated Nov. 30, 2017, 9 pages.
Chinese Office Action in Application 201480035401.9, dated Jan. 22, 2018, 15 pages.
Mexican Notice of Allowance in Application MX/a/2015/017624, dated Sep. 6, 2017 pages. (No english translation.).
U.S. Appl. No. 14/273,100, Office Action dated Oct. 2, 2017, 17 pages.
"First Office Action and Search Report Issued in Chinese Patent Application No. 201480035400.4", dated Mar. 5, 2018, 14 Pages.
U.S. Appl. No. 15/670,819, Office Action dated Feb. 23, 2018, 16 pages.
U.S. Appl. No. 15/600,995, Office Action dated Feb. 15, 2018, 11 pages.
U.S. Appl. No. 15/389,088, Amendment and Response filed Feb. 22, 2018, 11 pages.
U.S. Appl. No. 14/273,100, Amendment and Reponse filed Feb. 2, 2018, 13 pages.
U.S. Appl. No. 14/273,100, Office Action dated Mar. 14, 2018, 16 pages.
U.S. Appl. No. 15/600,995, Amendment and Response filed Apr. 30, 2018, 10 pages.
Russian Office Action in Application 2015154501, dated May 3, 2018, 7 pages. (No English Translation).
U.S. Appl. No. 15/389,088, Office Action dated May 11, 2018, 16 pages.
"Non Final Office Action Issued in U.S. Appl. No. 15/389,088", dated Aug. 27, 2018, 19 Pages.
"Non Final Office Action Issued in U.S. Appl. No. 15/600,995", dated Jun. 29, 2018, 11 Pages.
"Office Action Issued in European Patent Application No. 15717284.2", dated Jul. 13, 2018, 7 Pages.
"International Preliminary Report on Patentability Issued in PCT Application No. PCT/US2015/029334", dated Jul. 18, 2016, 8 Pages.

(56) References Cited

OTHER PUBLICATIONS

"International Preliminary Report on Patentability Issued in PCT Application No. PCT/US2015/021921", dated May 12, 2016, 8 Pages.
"Office Action Issued in Japanese Patent Application No. 2016521428", dated May 31, 2018, 6 Pages.
"Oral Hearing Issued in European Patent Application No. 15719880.5", dated Apr. 10, 2018, 10 Pages.
PCT Second Written Opinion Issued in PCT Application No. PCT/US2014/041014, dated May 11, 2015, 5 Pages.
"Second Office Action Issued in Chinese Patent Application No. 201480035400.4", dated Oct. 31, 2018, 5 Pages.
"Third Office Action Issued in Chinese Patent Application No. 201480035401.9", dated Jul. 27, 2018, 25 Pages.
"Office Action Issued in Russian Patent Application No. 2016138130", dated Oct. 18, 2018, 6 Pages. (W/O English Translation).
"Final Office Action Issued in U.S. Appl. No. 15/600,995", dated Dec. 21, 2018, 6 Pages.
"Office Action Issued in Japanese Patent Application No. 2016-559328", dated Dec. 18, 2018, 7 Pages.
"First Office Action and Search Report Issued in Chinese Application No. 201580016605.2", dated Mar. 22, 2019, 09 Pages.
"Office Action Issued in Australian Patent Application No. 2014281049", dated Mar. 15, 2019, 04 Pages.
"First Office Action and Search Report Issued in Chinese Application No. 201580012496.7", dated Mar. 7, 2019, 11 Pages.

* cited by examiner

Mobile Computing Device

ENVIRONMENTALLY AWARE DIALOG POLICIES AND RESPONSE GENERATION

CROSS-REFERENCE TO RELATED APPLICATIONS

This application is a continuation of and claims benefit from application Ser. No. 13/923,917, now U.S. Pat. No. 9,589,565, filed Jun. 21, 2013, entitled "ENVIRONMENTALLY AWARE DIALOG POLICIES AND RESPONSE GENERATION," which is hereby incorporated by reference in its entirety. To the extent appropriate, the present application claims priority to the above-referenced application.

BACKGROUND

Conversational dialog systems are used for a variety of different applications. For example, conversational dialog systems have been developed to allow earch for content, buy items, obtain directions, and the like. These conversational dialog systems are continually being improved to allow for more natural interactions to occur between a computer and a user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Environmental conditions, along with other information, are used to adjust different operations of a conversational dialog system. The environmental conditions may be used at different times within the conversational dialog system. The dialog manager and the response generation components in the conversational dialog system each use the available environmental conditions along with the other information in the dialog system (e.g., previous turn language understanding results in the dialog, speech recognition results and confidences, knowledge results, previous machine actions, session context, client context . . . ) when performing their operations. For example, the environmental conditions can be used to adjust the dialog manager's output (e.g., the machine action). The dialog state information that is used by the dialog manager includes environmental conditions along with other dialog information for the current turn in the dialog as well as environmental conditions for one or more past turns in the dialog. The environmental conditions can also be used after receiving the machine action to adjust the response that is provided to the user. For example, the response generator may use the environmental conditions to affect how the machine action is provided to the user (e.g., speech, visual . . . ).

DETAILED DESCRIPTION

Figure 1:
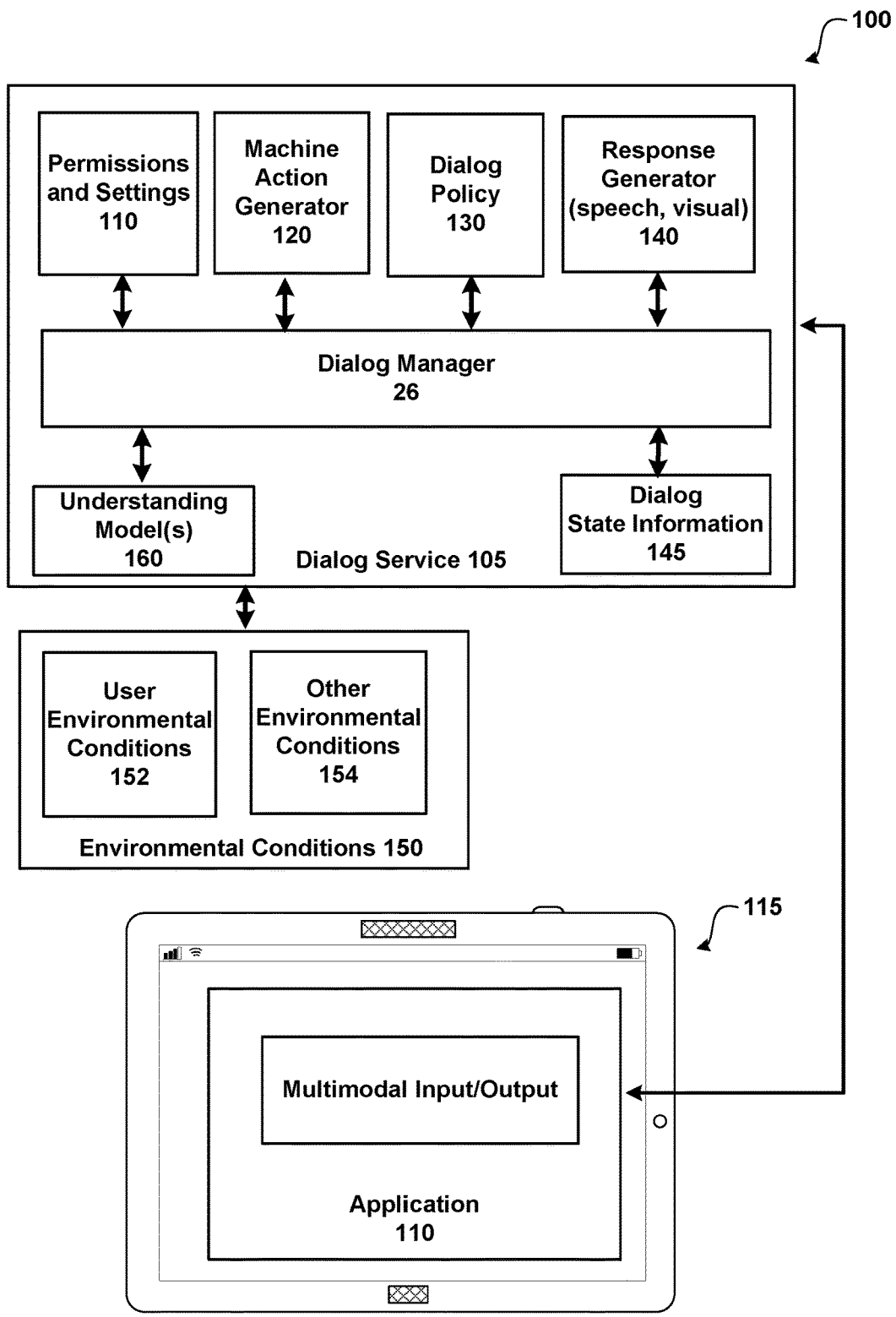
FIG. 1 illustrates using environmental conditions to adjust different operations performed by a conversational dialog system.

Referring now to the drawings, in which like numerals represent like elements, various embodiment will be described.

FIG. 1 illustrates using environmental conditions to adjust different operations performed by a conversational dialog system.

As illustrated, system 100 includes dialog service 105, dialog manager 26, permissions and settings 110, machine action generator 120, dialog policy 130, response generator 140, dialog state information 145, environmental conditions 150, understanding model(s) 160, application 110 and touch screen input device 115.

Generally, conversational dialog system 100 uses environmental signals (e.g., language understanding and knowledge results, speech recognition results and confidences . . . ) for policy and response generation in addition to the use of other information or signals typically available in the dialog system. The environmental signals augment (not replace) the signals typically used within a dialog system. Dialog manager 26 uses environmental conditions 150 in addition to dialog state information 145 to adjust different operations of a conversational dialog system. The environmental conditions may be used at different times within the conversational dialog system 100. The dialog manager 26, machine action generator 120, and the response generator 140 components in the conversational dialog system 100 can each use the available environmental conditions 150 when performing their operations.

Machine action generator 120 can use environmental conditions 150 to adjust the machine action that is determined along with using dialog state information 145. Generally, the environmental conditions 150 augment the dialog state information 145 that is used within the dialog system. For example, dialog state information 145 includes information, such as, but not limited to: e.g., previous turn language understanding results in the dialog, speech recognition results and confidences, knowledge results, previous machine actions, session context, client context, and the like. Each interaction between the user and the computing device (i.e., the machine) is a turn. The current turn is the current interaction between the user and the machine for which a machine action is being determined. A previous turn is a previous interaction between the user and the machine. According to an embodiment, the dialog state information 145 includes information relating to one or more previous turns. For example, language understanding results that associate a meaning to a natural language sentence are stored in dialog state information 145. These previous language understanding results may be used to provide a context for the current turn in the dialog. The dialog state information may also include knowledge results that are the results returned from a knowledge source, such as a database or data source. For example, if a user requests movies in a dialog turn, the knowledge results include a list of movies. The machine action that is determined using the environmental conditions may be different than the machine action that is determined without using the environmental conditions. For example, the machine action that is generated by machine action generator 120 may indicate to ask the driver if they are sure they would like to make a call while driving when environmental conditions 150 indicate that the user is currently driving. Without the use of environmental conditions 150 to augment the machine action, the machine action generator 120 would likely generate a machine action to automatically initiate the call while the user is currently driving instead of asking the driver if they are sure they would like to make a call while driving. Machine action generator 120 uses dialog policy 130 when determining the machine action. The dialog policy 130 includes different rules, including rules that use environmental conditions 150 and other dialog state information, to adjust the machine action that is generated.

Environmental conditions 150 can also be used by response generator 140 after receiving the machine action to adjust the response that is provided to the user. Environmental conditions 150 may affect how the machine action is provided to the user (e.g., speech, visual . . . ). For example, the response generated by response generator 140 may be a visual response when environmental conditions 150 indicate that the user's environment is noisy. The response generated by response generator 140 may be an auditory response when environmental conditions 150 indicate that the user's environment is very bright and it is unlikely that a display may be seen clearly.

Environmental conditions 150 may include a variety of different conditions, such as, but not limited to: weather conditions, traffic conditions, current activity conditions, a current computing device being used, and the like. The current activity conditions may include information, such as, but not limited to: a current speed, a current location, and the like. Generally, the environmental conditions relate to any environmental conditions that are associated with a user providing the input (the user dialog act). According to an embodiment, environmental conditions may also be associated with another user 154 (e.g., a contact that is being called). According to an embodiment, the environmental conditions that are collected and used to adjust the operation of the conversational dialog system are specified and authorized by the user.

In order to facilitate communication with the dialog manager 26, one or more callback routines, may be implemented. According to an embodiment, application program 110 is a multimodal application that is configured to receive speech input and input from a touch-sensitive input device 115 or other input devices. For example, voice input, keyboard input (e.g., a physical keyboard and/or SIP), video based input, and the like. Application program 110 may also provide multimodal output (e.g., speech, graphics, vibrations, sounds, . . . ). Dialog manager 26 may provide information to/from application 110 in response to user input (e.g., speech, gesture). For example, a user may say a phrase to identify a task to perform by application 110 (e.g., selecting a movie, buying an item, identifying a product, . . . ) Gestures may include, but are not limited to: a pinch gesture; a stretch gesture; a select gesture (e.g., a tap action on a displayed element); a select and hold gesture (e.g., a tap and hold gesture received on a displayed element); a swiping action and/or dragging action; and the like. Gestures may also include optically captured gestures, such as: a wave gesture, a scroll gesture, a guide gesture, and the like. For example, a device, such as MICROSOFT KINECT may be used to detect gestures.

System 100 as illustrated comprises a touch screen input device 115 that detects when a touch input has been received (e.g., a finger touching or nearly teaching the touch screen). Any type of touch screen may be utilized that detects a user's touch input.

A natural user interface (NUI) and/or some other interfaces may be used to interact with dialog service 105. For example, a combination of a natural language dialog and other non-verbal modalities of expressing intent (e.g., gestures such as the gestures described above, touch, gaze, images, videos, spoken prosody, etc.) may be used to interact with dialog service 105. Dialog manager 26 may use an understanding model (e.g., a Language Understanding (LU) model or a multimodal understanding model). As illustrated, dialog manager 26 is part of a dialog service 105 that receives speech utterances and is configured to have a dialog with a user.

Generally, Natural Language Understanding (NLU) in goal-oriented dialog systems is directed at identifying the domain(s) and intent(s) of the user, as expressed in natural language (NL), and to extract associated arguments or slots. For example, in an airline domain, users often request flight information (e.g., "I want to fly to Boston from New York next week"). More details are provided below.

Figure 2:
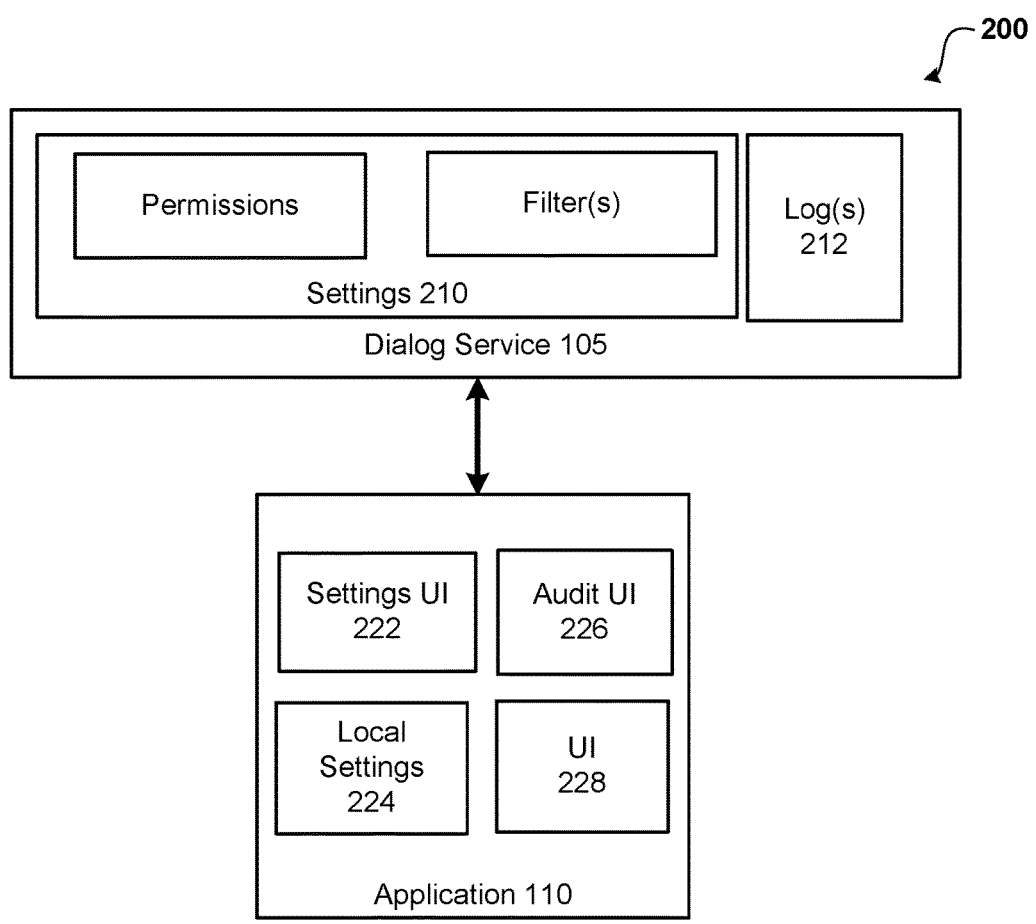
FIG. 2 shows interactions between an application and a dialog service for configuring permissions.

FIG. 2 shows interactions between an application and a dialog service for configuring permissions.

As illustrated, FIG. 2 shows dialog service 105 including settings 210 and log(s) 212 and application 110 that includes settings user interface 222, audit user interface 226, location user interface 228 and local settings 224.

A user may configure different criteria, such as permissions, filters and settings that are related to the operation of the application 110 and to the use and collection of environmental conditions that are associated with one or more users. For example, an authorized user may determine what environmental conditions may be collected and used by dialog service 105.

The user may set permissions that specify what environmental conditions may be collected. For example, a user may opt in to allow different types of environmental conditions to be collected and used by dialog service 105.

A user may also configure one or more filters that filter the information using various criteria (e.g., time of day, requesting device, requesting location, and the like). For example, a user may allow certain environmental conditions to be collected during certain times and not allow environmental conditions to be collected during other times. A user may configure a filter to limit the accuracy of one or more of the environmental conditions. For example, location information that is associated with a user may be configured to provide a general location as compared to detailed location. A user may also set local settings 224 such as application customization settings (e.g., color schemes, icons and the like) for use when interacting with application 110. For example, the settings 224 may change an appearance of a User Interface, such as UI 228.

Audit user interface 226 may be used by an authorized user to view and interact with information relating to environmental conditions that are stored in log 212. Access to the log related data is limited to an authorized user who has provided the correct security credentials. The data is stored securely within log(s) 212.

Figure 3:
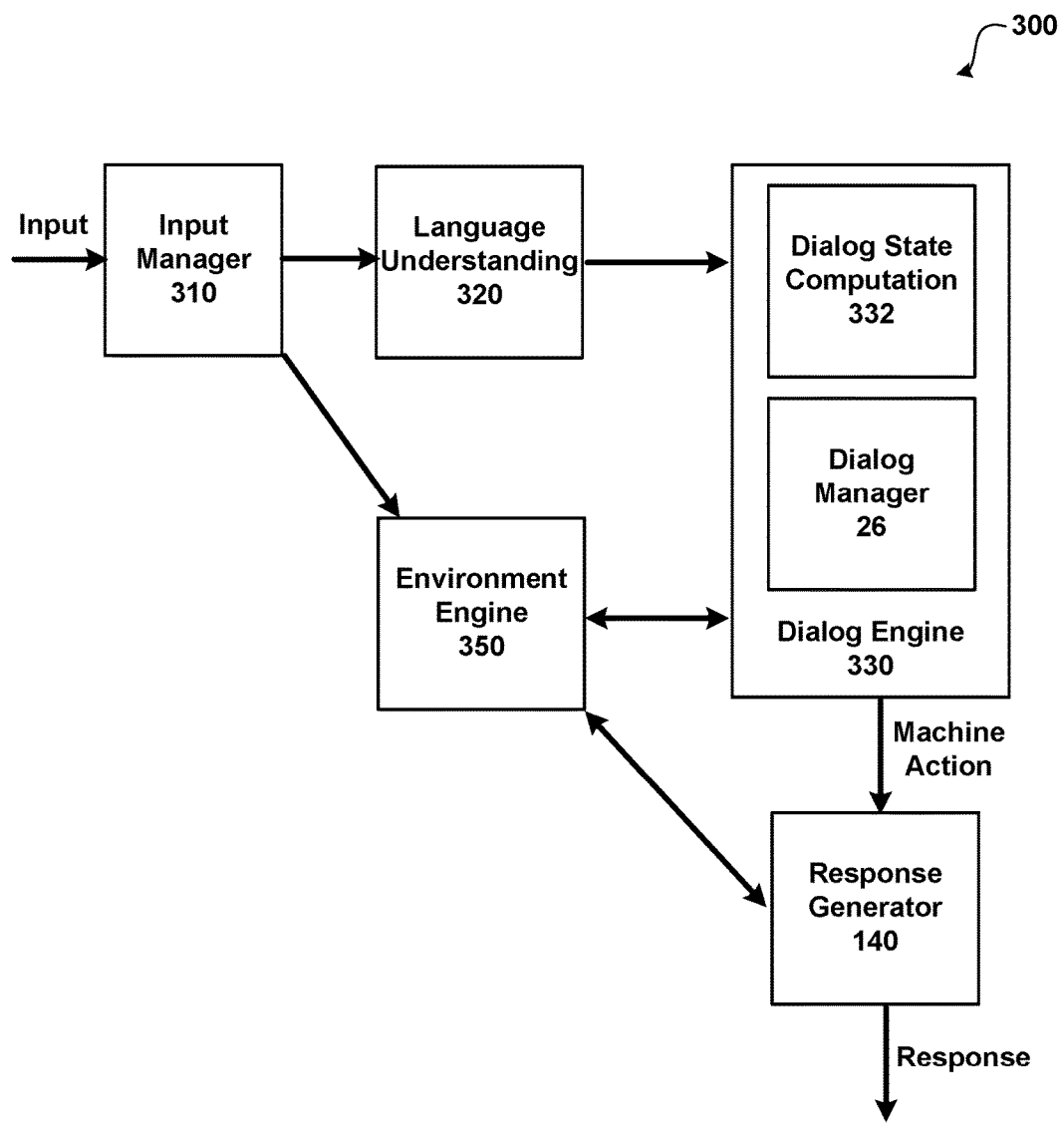
FIG. 3 illustrates an exemplary conversational dialog system using environmental conditions.

FIG. 3 illustrates an exemplary conversational dialog system using environmental conditions.

As illustrated, system 300 includes input manager 310, language understanding component 320, dialog engine 330, response generator 140, and environment engine 350.

Input manager 310 is configured to receive a user input (the user dialog act). The user dialog act may be different types of user input. For example, the user dialog act may be speech input (e.g., an utterance), touch input, gesture input, text input, as well as other types of input. Input manager 310 may include different components, such as an Automatic Speech Recognizer (ASR), a gesture recognizer, a handwriting recognizer, and the like. When the user dialog act is speech, the speech is recognized by input manager 310 using ASR. Input manager 310 outputs text that is delivered to language understanding component 320.

Language understanding component 320 is configured to receive and analyze the text. Generally, the language understanding component 320 associates a meaning to the words of the text. For example, the language understanding component 320 may tag the text, perform a syntactic analysis of the text, and the like. The language understanding component 320 is traditionally a rules based component that converts natural language sentences into semantic representations.

Dialog engine 330 manages the dialog by determining a machine action in response to the user dialog act. Dialog engine 330 may be a rules based model or a statistical model, or some combination of rules and statistical models. Dialog engine 330 computes possible dialog states using dialog state computation component 332. Dialog state computation component 332 uses environmental conditions obtained from environment engine 350 in addition to other dialog state information when calculating the possible dialog states. The environmental conditions that are used by the dialog system are in addition to other dialog information generally used within a dialog system, such as but not limited to: previous turn language understanding results, speech recognition results and confidences, knowledge results, previous machine actions, session context, client context, and the like . The environmental conditions may be associated with one or more users. Dialog manager 26 determines the machine action or machine actions. The dialog state information that is used by dialog manager 26 includes environmental conditions for the current turn in the dialog as well as environmental conditions for one or more past turns in the dialog. Dialog engine 330 provides the determined machine action to response generator 140.

Response generator 140 uses environmental conditions that are obtained from environment engine in addition to the other dialog information to determine what type of response to provide the user. For example, the response generator 140 may determine to provide a spoken response to the user or a visual response to the user. For example, a Text-to-Speech ("TTS") component may output the response as synthesized speech when determined. According to an embodiment, the environmental conditions are updated after dialog manager 26 determines the machine action and before response generator 140 receives the environmental conditions.

Figure 4:
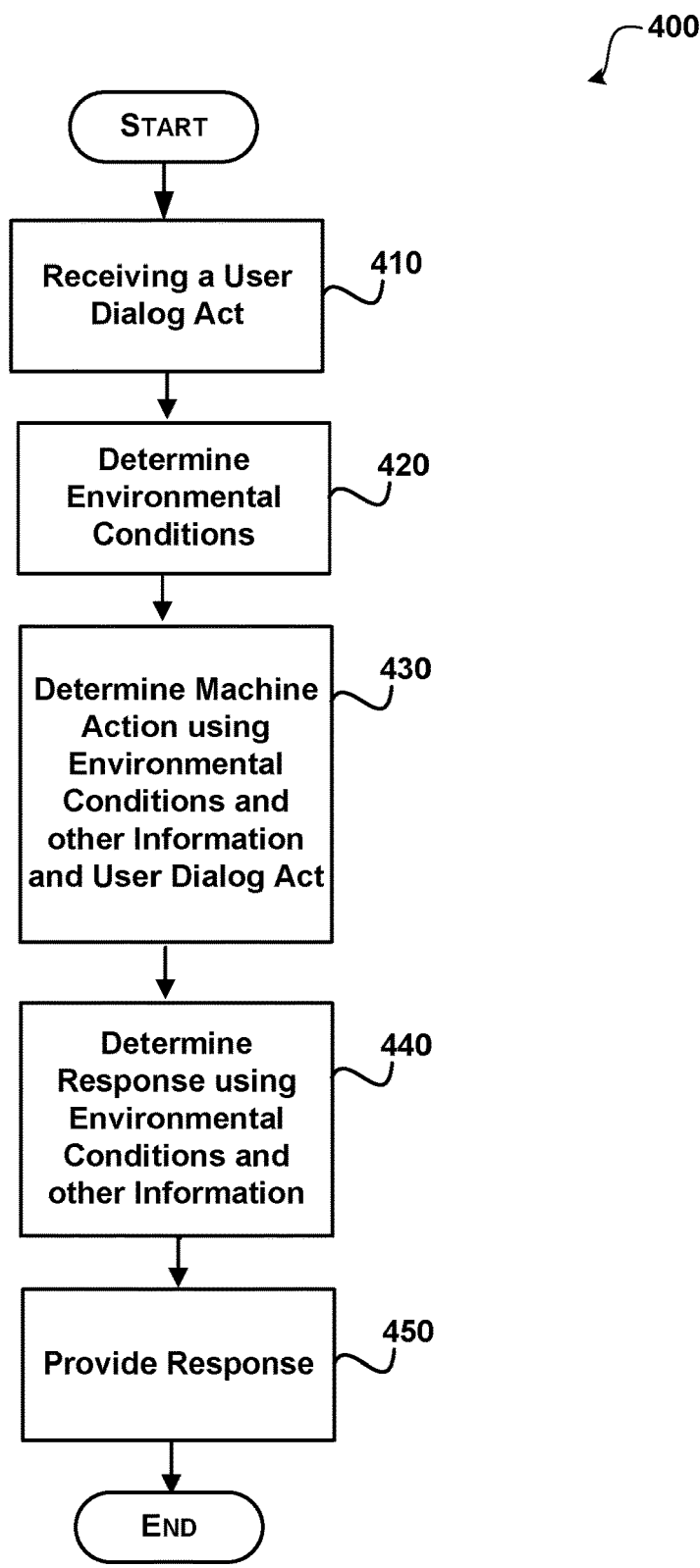
FIG. 4 illustrates a process for using environmental conditions in a conversational dialog system.

FIG. 4 illustrates a process for using environmental conditions in a conversational dialog system. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof After a start operation, the process 400 moves to operation 410, where a user dialog act is received. The user dialog act may be different types of user input, such as, but not limited to: speech input (e.g., an utterance), touch input, gesture input, text input, as well as other types of input. Generally, the user dialog act is part of a conversation with a dialog system.

Transitioning to operation 420, environmental conditions are determined. The environmental conditions are associated with one or more users. For example, the environmental conditions may be current environmental conditions that are associated with a user making the user dialog act. The environmental conditions may also be current environmental conditions that are associated with another user that is a part of the user dialog act. For example, the user dialog act may be an act to contact another user. The environmental conditions may include a variety of different conditions, such as, but not limited to: weather conditions (e.g., temperature, pressure . . . ), traffic conditions, current activity conditions, a current computing device being used, and the like. Generally, any environmental condition may be determined and used by the conversational dialog system. The current activity conditions may include a variety of different environmental conditions, such as, a location of the user, a velocity of the user, and the like.

Moving to operation 430, the machine action is determined using the environmental conditions, other dialog state information, and the user dialog act. According to an embodiment, the environmental conditions are used in addition to the other dialog state information by the conversational dialog system when calculating the possible dialog states. For example, the other dialog state information may include but is not limited to: previous turn language understanding results, speech recognition results and confidences, knowledge results, previous machine actions, session context, client context, and the like. The dialog state information includes environmental conditions for the current turn in the dialog as well as environmental conditions for one or more past turns in the dialog.

The following examples illustrate adjusting the machine action using environmental conditions and the other information in the dialog system to determine the machine action. The examples are for illustration purposes and are not intended to be limiting.

The following is an example dialog while a user is driving. 1) User: "Call Paul at home"; 2) Dialog System: "Are you sure you want to make the call while driving?" As can be seen, instead of the machine action being to make the call, the machine action was adjusted to request whether the user wanted to make the call.

The next example is a dialog where a user attempts to call a contact in a time zone where the contact is likely sleeping. 1) User: "Call Paul"; 2) Dialog System: "Paul is likely sleeping right now. Would you like to send a message to Paul instead?" In this example, the environmental conditions that are associated with the contact changed the machine action.

The next example is a dialog where a user attempts to place a call while user is in a roaming mode or the contact is in a roaming mode. 1) User: "Call Paul"; Dialog System: "Calling Paul will cost Paul two dollars a minute since he is currently roaming. Would you like to message Paul instead?" In this example, the environmental conditions that changed the machine action are associated with the current activity of the contact.

The next example is a dialog where a user attempts to call a contact while the contact is likely driving. 1) User: "Call Paul"; 2) Dialog System: "Paul may be driving. Would you like to send a message instead?" In this example, the environmental conditions that changed the machine action are associated with the current activity of the contact.

The next example is a dialog where a user attempts to call a contact while the contact is in a noisy environment. 1) User: "Call Paul"; 2) Dialog System "Paul might not be able to hear you well. Would you like to send a message instead?" In this example, the environmental conditions that changed the machine action are associated with the current noise conditions of the contact.

Flowing to operation 440, a response for the machine action is determined using the environmental conditions. Many different types of responses may be provided (e.g., visual, auditory, haptic . . . ). A spoken response may be provided to the user or a visual response may be provided to the user. For example, a user may be in a noisy environment, and the response is adjusted to be louder than normal. The type of response may also be changed. For example, the response may be changed from an auditory response to a visual response.

Moving to operation 450, the response is provided to the user.

The process then flows to an end operation and returns to processing other actions.

Figure 5:
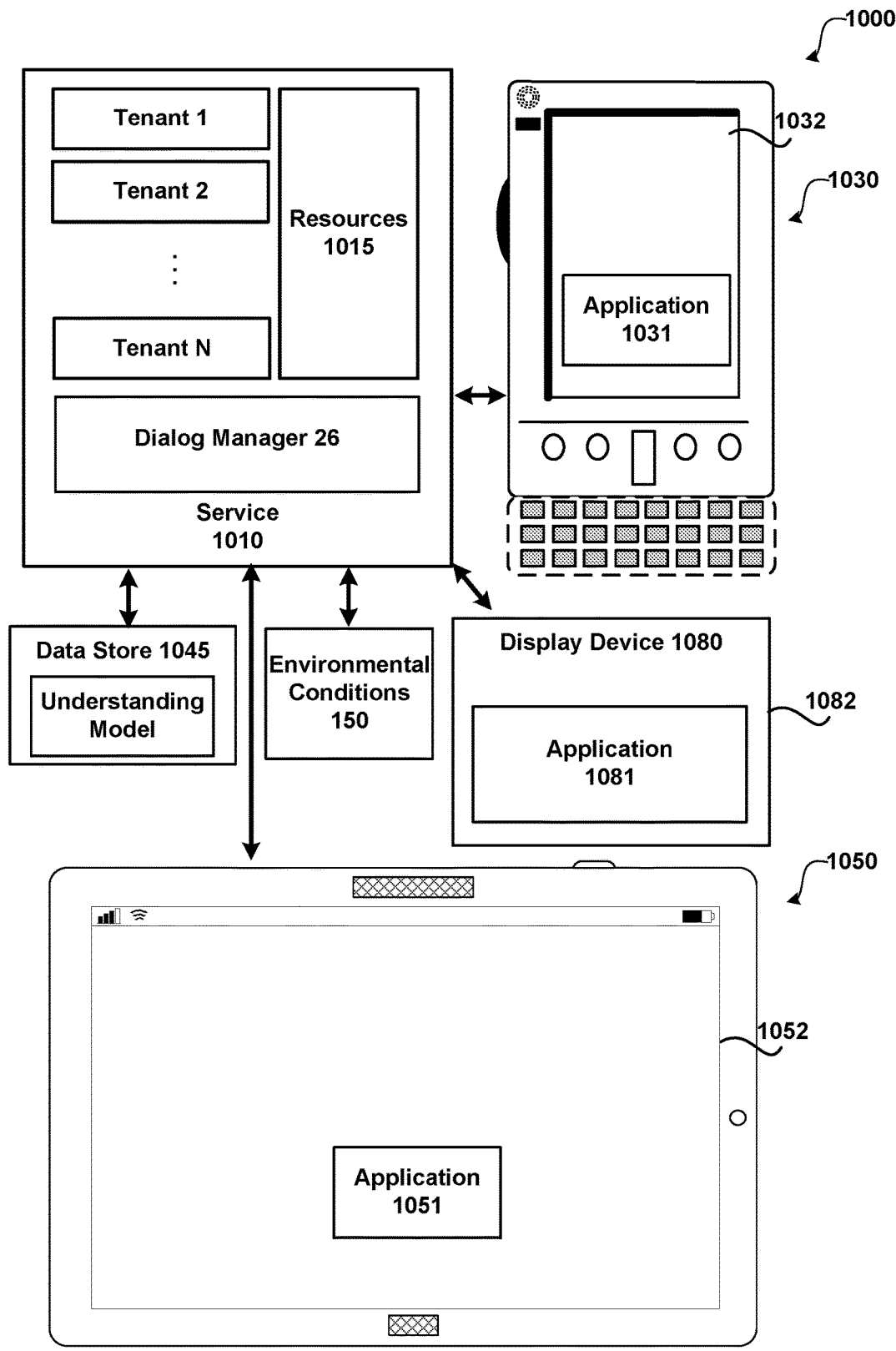
FIG. 5 illustrates an exemplary online system that uses environmental conditions in determining a machine action and how to deliver a response in a dialog.

FIG. 5 illustrates an exemplary online system that uses environmental conditions in determining a machine action and how to deliver a response in a dialog. As illustrated, system 1000 includes service 1010, data store 1045, environmental conditions 150, touch screen input device 1050 (e.g., a slate), smart phone 1030 and display device 1080.

As illustrated, service 1010 is a cloud based and/or enterprise based service that may be configured to provide services, such as dialog services as described herein. The service may be interacted with using different types of input and output. For example, a user may use speech input, touch input, hardware based input, and the like. Functionality of one or more of the services provided by service 1010 may also be configured as a client/server based application.

As illustrated, service 1010 is a multi-tenant service that provides resources 1015 and services to any number of tenants (e.g., Tenants 1-N). Multi-tenant service 1010 is a cloud based service that provides resources 1015 to tenants subscribed to the service and maintains each tenant's data separately and protected from other tenant data.

System 1000 as illustrated comprises a touch screen input device 1050 (e.g., a slate device) and smart phone 1030 that detects when a touch input has been received (e.g., a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g., a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 are configured with multimodal input and output and each include an application (1031, 1051, 1081) that interact with service 1010.

As illustrated, touch screen input device 1050, smart phone 1030, and display device 1080 shows exemplary displays 1052, 1032, and 1082 showing the use of an application. Data may be stored on a device (e.g., smart phone 1030, touch screen input device 1050 and/or at some other location (e.g., network data store 1045). Data store 1045, or some other store, may be used to store an understanding model, as well as other data. The applications used by the devices may be client based applications, server based applications, cloud based applications or some combination. According to an embodiment, display device 1080 is a device such as a MICROSOFT XBOX coupled to a display.

Dialog manager 26 is configured to perform operations relating to processes as described herein. Dialog manager 26 is configured to access environmental conditions 150. While manager 26 is shown within service 1010, the functionality of the manager may be included in other locations (e.g., on smart phone 1030 and/or touch screen input device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
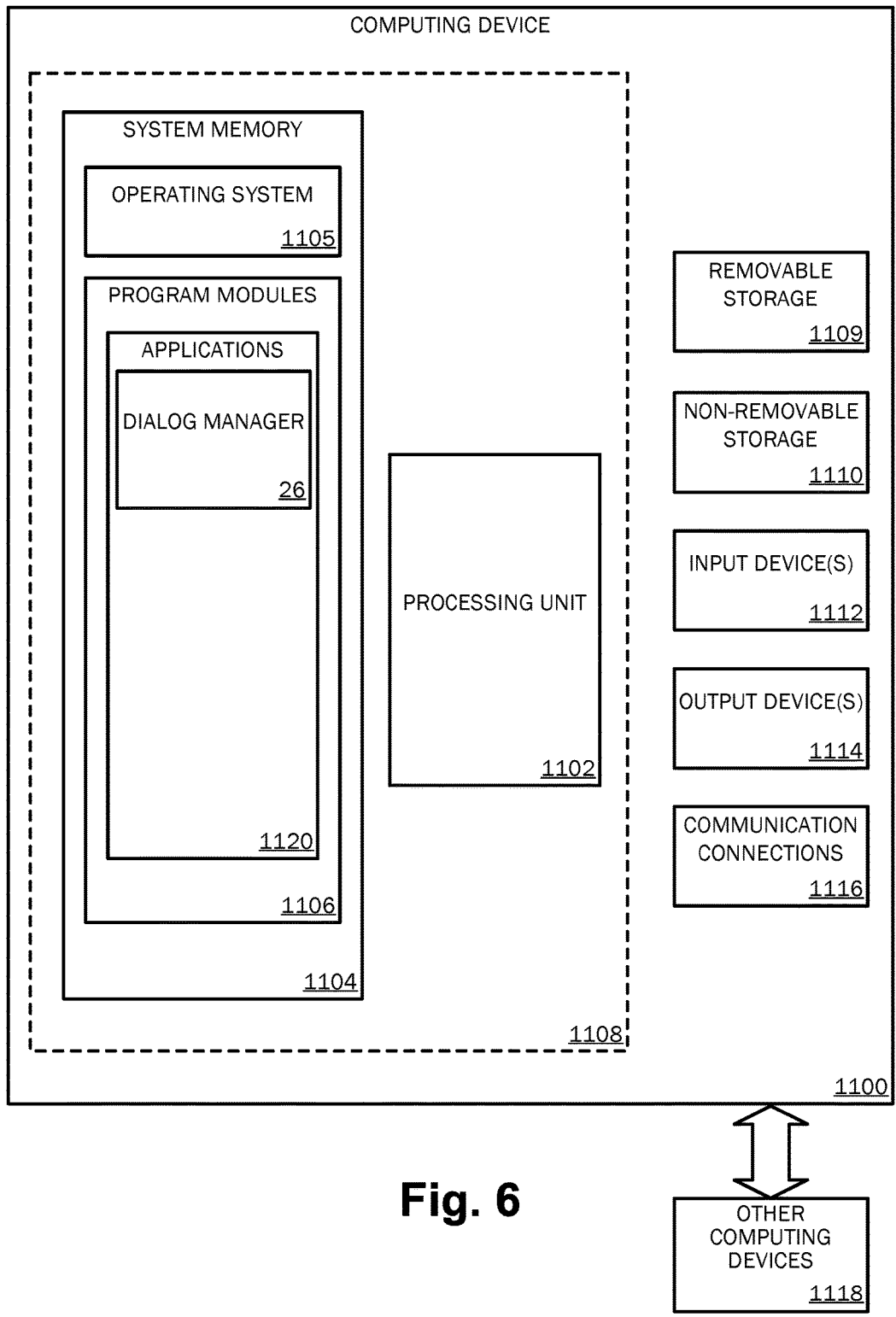
FIGS. 6, 7A, 7B and 8 and the associated descriptions provide a discussion of a variety of operating environments in which embodiments of the invention may be practiced.
Figure 7A:
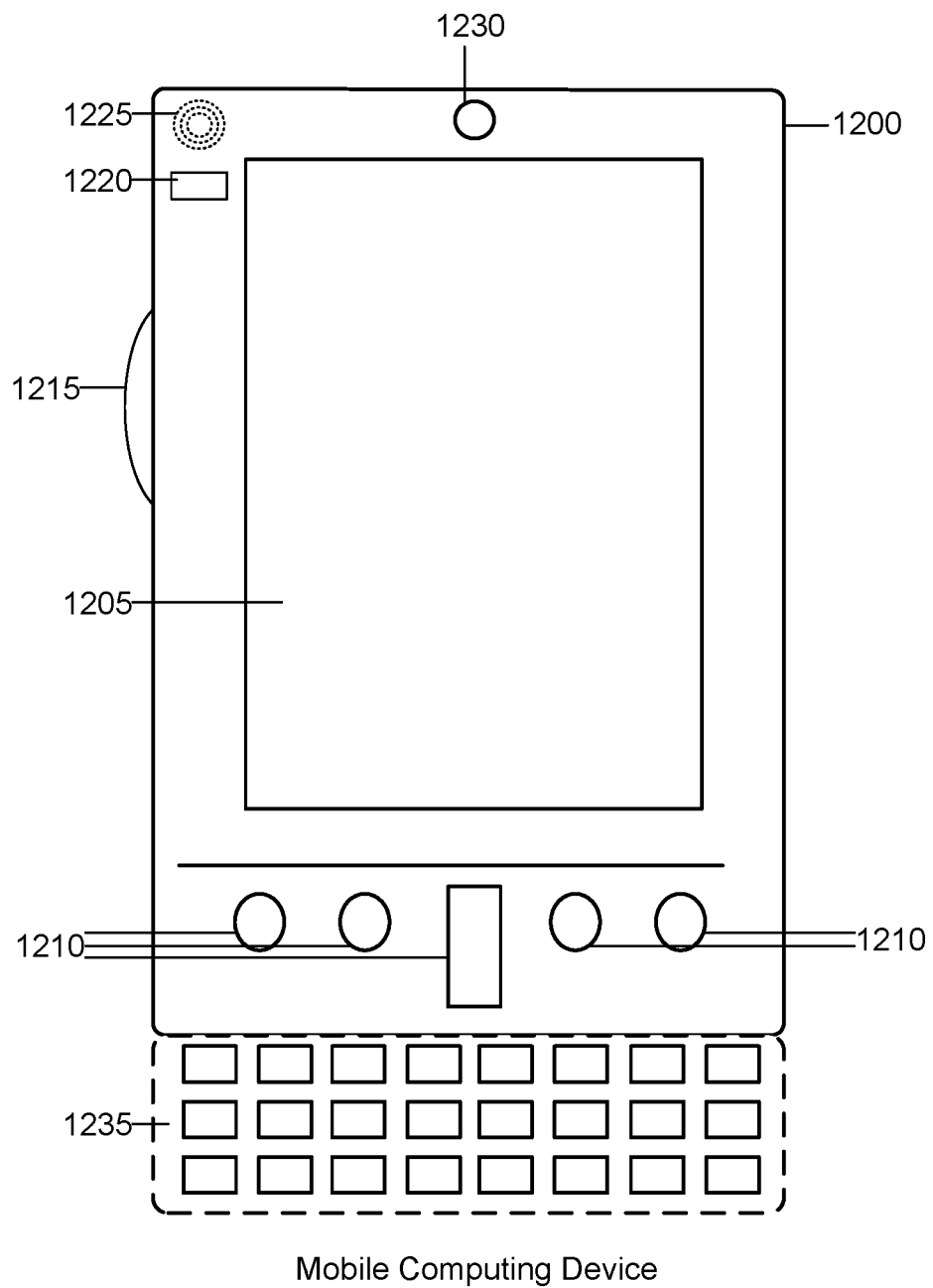
Figure 7B:
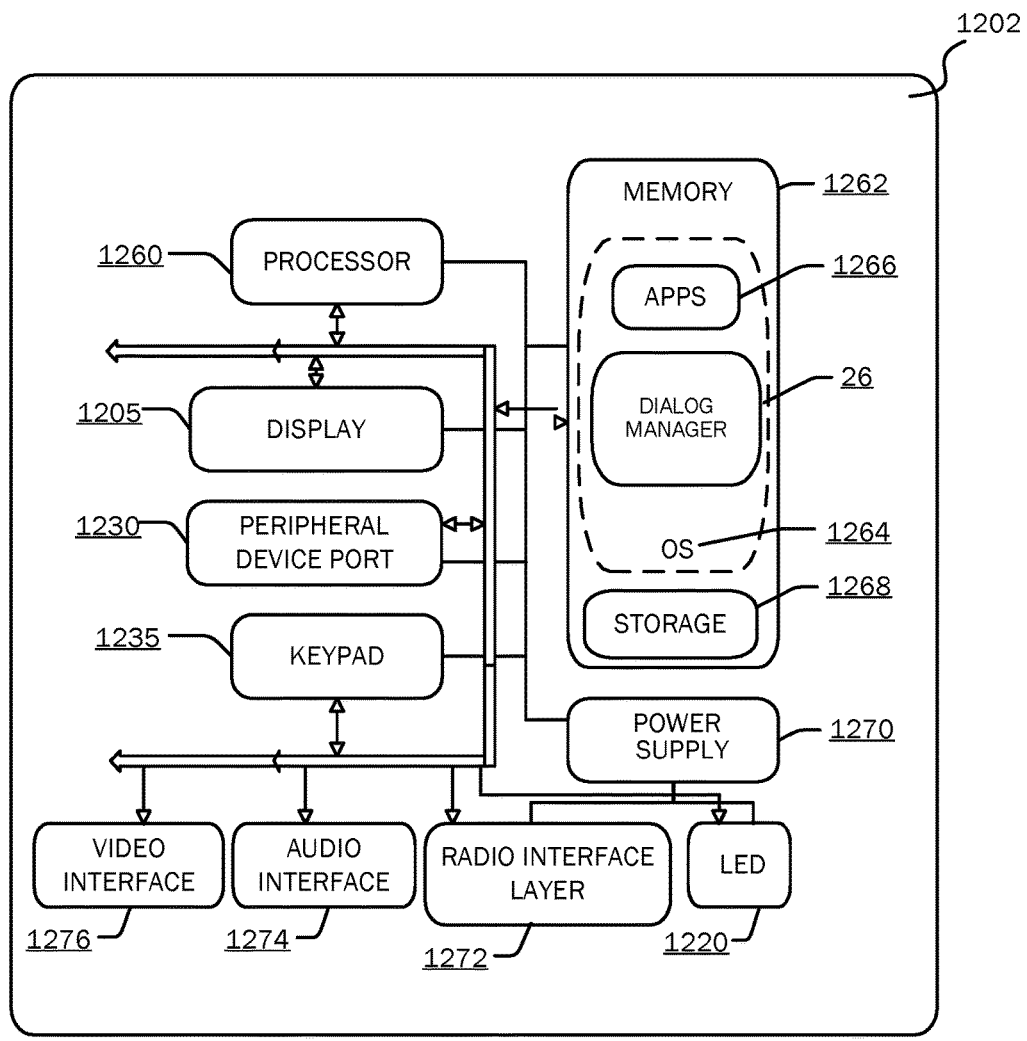
Figure 8:
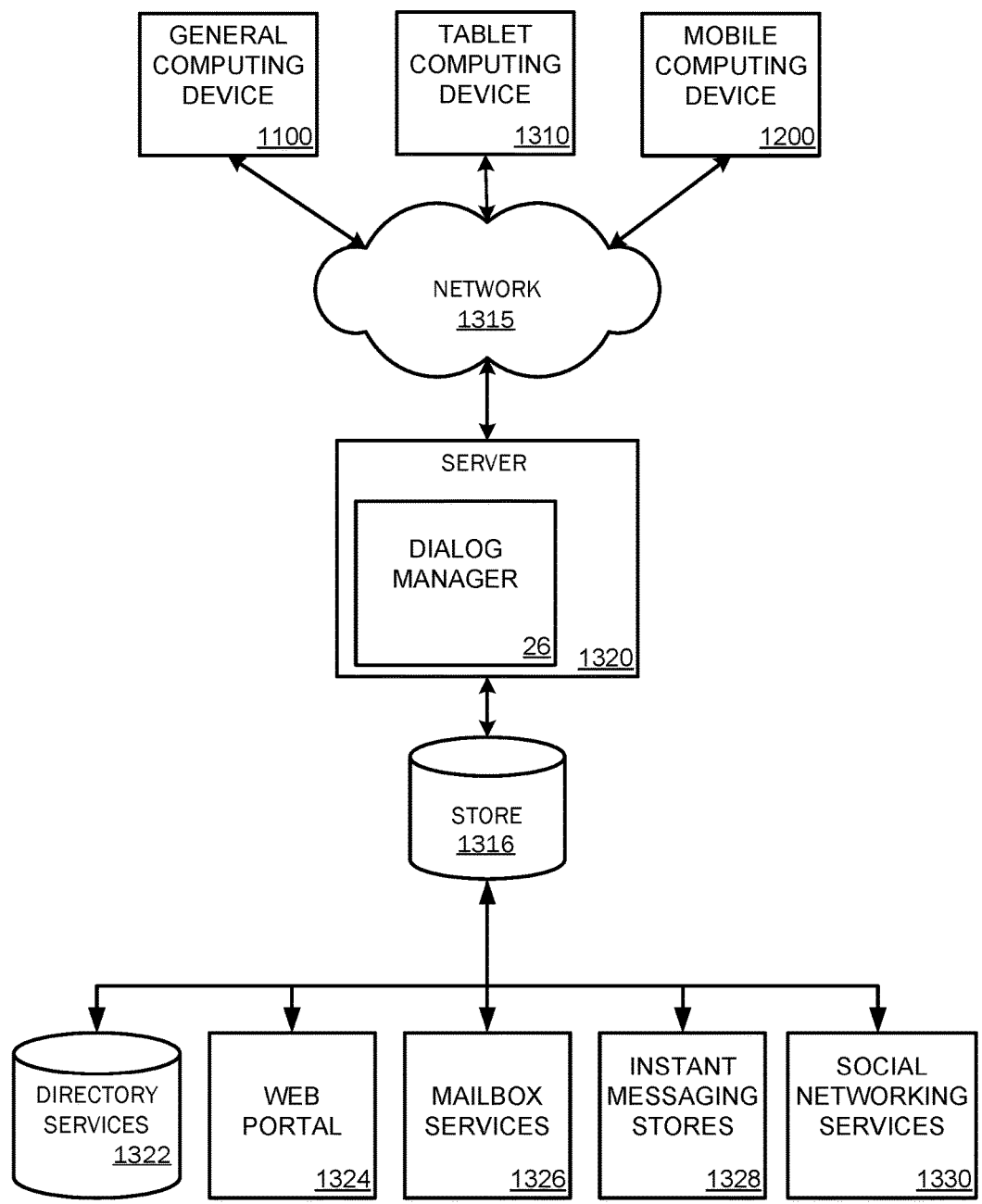

FIGS. 6-8 and the associated descriptions provide a discussion of a variety of operating environments in which embodiments of the invention may be practiced. However, the devices and systems illustrated and discussed with respect to FIGS. 6-8 are for purposes of example and illustration and are not limiting of a vast number of computing device configurations that may be utilized for practicing embodiments of the invention, described herein.

FIG. 6 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the dialog manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 6 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 6 by a removable storage device 1109 and a non-removable storage device 1110.

As stated above, a number of program modules and data files may be stored in the system memory 1104. While executing on the processing unit 1102, the program modules 1106 (e.g., the dialog manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the dialog manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 1200, for example, a mobile telephone, a smart phone, a tablet personal computer, a laptop computer, and the like, with which embodiments of the invention may be practiced. With reference to FIG. 7A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients, players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the dialog manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 7B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 8 illustrates an embodiment of an architecture of an exemplary system, as described above. Content developed, interacted with, or edited in association with the dialog manager 26 may be stored in different communication channels or other storage types. For example, various documents may be stored using a directory service 1322, a web portal 1324, a mailbox service 1326, an instant messaging store 1328, or a social networking site 1330. The dialog manager 26 may use any of these types of systems or the like for enabling data utilization, as described herein. A server 1320 may provide the dialog manager 26 to clients. As one example, the server 1320 may be a web server providing the dialog manager 26 over the web. The server 1320 may provide the dialog manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, and 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A system comprising:
   at least one processor; and
   a memory storing instructions that when executed by the at least one processor perform a set of operations comprising:
      receiving a user dialog act requesting a computer system to perform a task involving a contact;
      accessing environmental conditions that are associated with the contact, wherein the environment conditions include at least one of a noise level, a time zone, or a temperature;
      based on the environmental conditions and the user dialog act, determining a machine action to display a suggestion to send a text-based message to the user; and
      performing the machine action to display the suggestion to the user.

2. The system of claim 1, wherein the task is calling the contact.

3. The system of claim 1, wherein the machine action is displaying a suggested action other than the task.

4. The system of claim 3, wherein the suggested action is messaging the contact.

5. The system of claim 1, wherein the environmental conditions that are associated with the contact include a noise level.

6. The system of claim 1, wherein determining the machine action is further based on dialog state information, wherein the dialog state information includes at least one of: previous turn language understanding results, speech recognition results and confidences, knowledge results, previous machine actions, session context, or client context.

7. The system of claim 1, wherein the environmental conditions indicate that the contact is in at least one of the following conditions: in a roaming service area or in a noisy environment.

8. A computer-implemented method, performed by at least one processor, for using environmental conditions of a contact in a conversational dialog system, comprising:
   receiving a user dialog act requesting a computer system to perform a task involving the contact;
   accessing environmental conditions that are associated with the contact;
   determining from the environmental conditions that the contact is in at least one of the following conditions: a roaming service area or a time zone where the time is night;
   based on the determination from the environmental conditions, determining a machine action; and
   performing the machine action to provide a response to the user.

9. The method of claim 8, wherein the task is calling the contact.

10. The method of claim 8, wherein the machine action is displaying a suggested action other than the task.

11. The method of claim 10, wherein the suggested action is messaging the contact.

12. The method of claim 8, wherein the environmental conditions that are associated with the contact include at least one of: a location; a noise level; a velocity; a temperature; a current activity; or a current computing device.

13. The method of claim 8, wherein determining the machine action is further based on dialog state information, wherein the dialog state information includes at least one of: previous turn language understanding results, speech recognition results and confidences, knowledge results, previous machine actions, session context, or client context.

14. The method of claim 8, wherein the environmental conditions further indicate that the contact is in a noisy environment.

15. A storage device storing computer-executable instructions for using environmental conditions of a contact in a conversational dialog system, the instructions comprising:
   receiving, from a user, a user dialog act requesting a computer system to call the contact;
   accessing environmental conditions that are associated with the contact;
   based on the environmental conditions and the user dialog act, determine a suggested action other than calling the contact;
   providing the suggested action to the user, wherein the suggested action is sending a text-based message to the contact;
   receiving further input from the user; and
   based on the further input, sending a text-based message to the contact.

16. The storage device of claim 15, wherein the environmental conditions that are associated with the contact include at least a noise level.

17. The storage device of claim 15, wherein the environmental conditions that are associated with the contact include at least one of: a location; a noise level; a velocity; a temperature; a current activity; or a current computing device.

18. The storage device of claim 15, wherein the environmental conditions indicate that the contact is in at least one of the following conditions: in a roaming service area, driving, or in a noisy environment.

19. The storage device of claim 15, wherein determining the suggested action is further based on dialog state information, wherein the dialog state information includes at least one of: previous turn language understanding results, speech recognition results and confidences, knowledge results, previous machine actions, session context, or client context.

20. The storage device of claim 15, wherein the instructions further comprise:
   accessing environmental conditions that are associated with the user; and
   based on the environmental conditions that are associated with the user, determining an output type for providing the suggested action to the user, wherein the output type is at least one of audible or visual.

\* \* \* \* \*